United States Patent [19]

Nakamura

[11] Patent Number: 5,008,529
[45] Date of Patent: Apr. 16, 1991

[54] PHOTOELECTRIC SWITCHING APPARATUS OF REFLECTION TYPE PROJECTING RED AND INFRARED LIGHT

[75] Inventor: Arata Nakamura, Kyoto, Japan

[73] Assignee: Omron Tateisi Electronics Co., Kyoto, Japan

[21] Appl. No.: 551,046

[22] Filed: Jul. 6, 1990

Related U.S. Application Data

[63] Continuation of Ser. No. 310,685, Feb. 15, 1989, abandoned.

[30] Foreign Application Priority Data

Feb. 15, 1988 [JP] Japan .................................. 63-18535

[51] Int. Cl.$^5$ .......................... G01V 9/04; G01J 3/50
[52] U.S. Cl. .................................. 250/221; 250/222.1; 250/226
[58] Field of Search .................. 250/221, 222.1, 226, 250/223 R, 339, 229, 561; 340/555, 556, 557; 357/17, 19

[56] References Cited

U.S. PATENT DOCUMENTS

| | | | |
|---|---|---|---|
| 4,057,146 | 11/1977 | Castaneda et al. | 250/226 |
| 4,224,608 | 9/1980 | Lederer | 250/221 |
| 4,309,604 | 1/1982 | Yoshikawa et al. | 250/226 |
| 4,546,246 | 10/1985 | Bechtel | 250/226 |
| 4,635,032 | 1/1987 | Virtanen | 250/205 |
| 4,803,373 | 2/1989 | Imamura et al. | 250/222.1 |
| 4,822,996 | 4/1989 | Lind | 250/222.1 |
| 4,926,049 | 5/1990 | Nakamura et al. | 250/561 |
| 4,947,036 | 8/1990 | Pokorski et al. | 250/226 |

FOREIGN PATENT DOCUMENTS 2442457 7/1980 France .......................... 340/556

Primary Examiner—David C. Nelms
Assistant Examiner—Michael Messinger
Attorney, Agent, or Firm—Foley & Lardner, Schwartz, Jeffery, Schwaab, Mack, Blumenthal & Evans

[57] ABSTRACT

The projection lights including the red and infrared lights are projected from a light projecting device (3) onto a reflex reflector (7) arranged at a position which is away from the light projecting device by a predetermined distance. The reflex reflector reflects the red light and absorbs the infrared light. The reflected lights from the reflex reflector or an object to be detected are detected by a photo sensitive device (4). The photo sensitive device individually detects the red light and infrared light and outputs two light detection signals. The sum of the light detection signals is compared with the first threshold value. The difference between the light detection signals is compared with the second threshold value. An object detection signal is formed on the basis of the logical arithmetic operation of the results of the comparison.

12 Claims, 7 Drawing Sheets

PHOTOELECTRIC SWITCHING APPARATUS OF REFLECTION TYPE PROJECTING RED AND INFRARED LIGHT

This application is a continuation, of application Ser. No. 07/310,685, filed Feb. 15, 1989.

BACKGROUND OF THE INVENTION

1. Field of the Invention

The present invention relates to a reflection type photoelectric switching apparatus comprising a photoelectric switching unit having a light projecting portion and a photo sensitive portion and a reflex reflector arranged at a position which is away from the photoelectric switching unit by a predetermined distance, wherein the photoelectric switching unit and reflex reflector are arranged in a manner such that a projection light from the light projecting portion is projected onto the reflex reflector and the reflected light from the reflex reflector is detected by the photo sensitive portion.

2. Prior Art Statement

In the above photoelectric switching apparatus of the reflex reflecting type, since an amount of reflected light which is detected by the photo sensitive portion changes when an object passes through the region between the photoelectric switching unit and the reflex reflector, the object is detected on the basis of such a change. However, when the object has the mirror surface (metal glossy surface or the like), almost all of the projection light is reflected by the object and its reflection is the mirror surface reflection in which an incident angle and a reflection angle are equal. Therefore, almost all of the reflected light is detected or is not detected by the photo sensitive portion in dependence on the position of the object (distance from the object to the photoelectric switching unit), so that the reliability is low.

To solve such a drawback, as shown in JP-A-59-119628, there has been proposed a reflex reflection type photoelectric switching apparatus in which the lights of two different wavelength bands, for instance, the red light and infrared light are irradiated onto a reflex reflector by using two light projecting devices, the reflex reflector is constructed so as to reflect only the infrared light and to absorb the lights of wavelength bands other than the infrared light, and by mutually comparing the levels of light detection signals of the two kinds of lights, the reflex reflector and object are distinguished.

However, such a reflex reflection type photoelectric switching apparatus has a drawback such that an object having the print color such as blue, purple, or the like cannot be distinguished from the reflex reflector. That is, as shown in FIG. 6, an object having the color of blue, purple, or the like absorbs the red light and reflects the infrared light having a long wavelength and has the same spectrum characteristic as that of the reflex reflector. Therefore, there is a drawback such that the reflex reflector locating at a remote distance and the blue object existing at a near distance cannot be distinguished and the object cannot be detected.

On the other hand, the foregoing reflection type photoelectric switch has a drawback such that two light projecting portions are necessary and the number of parts of the optical system increases. Further, since the optical axes of the two light projecting portions are slightly deviated, there is a problem such that if the object to be detected shuts out only the light beam of either one of the optical axes, there is a fear such that a detection signal is erroneously output.

SUMMARY OF THE INVENTION

It is an object of the present invention to provide a reflex reflection type photoelectric switching apparatus in which even in the case of an object having the mirror surface, or even if the surface of the object has any color, all of the objects which shut off the light can be certainly detected, and which has a relatively simple optical system.

Another object of the invention is to provide a reflex reflection type photoelectric switching apparatus in which even if an object exists at a position which is close to or far from a light projecting portion or a photo sensitive portion, the object can be accurately detected.

According to the present invention, there is provided a reflection type photoelectric switching apparatus, comprising: light projecting means for projecting a red light and an infrared light; a reflex reflector, arranged at a position which is away from the light projecting means, for reflecting the red light and absorbing the infrared light; photo sensitive means for individually detecting the red and infrared lights reflected from the reflex reflector or an object to be detected and for outputting two light detection signals corresponding to the red and infrared lights; adding means for adding the two light detection signals; first comparing means for comparing the level of the signal added by the adding means with a first threshold value; arithmetic operating means for producing a signal relating to the difference between the two light detection signals; second comparing means for comparing the level of an output signal of the arithmetic operating means with a second threshold value; and a logic circuit for getting a predetermined logic of outputs of the first and second comparing means and for outputting an object detection signal in accordance with the result of the logic.

According to the present invention, the red light and infrared light are emitted from the light projecting means and given to the reflex reflector by the same optical axis. The reflex reflector absorbs the infrared light and reflects the red light. The reflected light is given to photo sensitive means which has sensitivities corresponding to the lights having both wavelengths of the infrared light and red light and which respectively detects infrared light and red light. By comparing light detection signals with a predetermined threshold value, an object which passes through an optical path between the reflex reflector and the photoelectric switch is detected. That is, since the levels of the two light detection signals are low in the case of an ordinary reflection object, the existence of the object is detected by the first comparing means. In the case of an object having the mirror surface or a white or blue object, since a difference occurs between the two light detection signals, by comparing the difference with a second threshold value, an object detection signal is derived from the second comparing means. The presence or absence of all of the objects is discriminated by the logic arithmetic operations.

As mentioned above, according to the invention, since the reflex reflector which absorbs the infrared light and reflects the red light is used, there is an advantage such that all of the objects including blue and purple objects can be certainly detected. On the other hand, since the lights having different wavelengths are emitted from one light projecting device, the construction of the optical system is extremely simplified and the whole photoelectric switching apparatus can be miniaturized. Further, since the light projection optical axes of the red and infrared lights which are projected from the photoelectric switching apparatus are not separated, an erroneous detection of the object which is caused since either one of the optical axes is shut off can be prevented.

Further, since the light detection signals are amplified by a logarithm amplifier or the intensities of the projection lights are controlled in accordance with the levels of the light detection signals, the output of the amplifier is not saturated. Further, even if an object exists at any of the far and near locations, the light detection signals of the proper levels can be obtained and the object can be always accurately detected.

BRIEF DESCRIPTION OF THE DRAWINGS

FIG. 2b is a graph showing a light emission spectrum characteristic of the diode of FIG. 2a;

FIG. 4b is an equivalent circuit diagram of the device of FIG. 4a;

FIG. 4c is a graph showing a spectrum characteristic of a sensitivity of the device of FIG. 4a;

FIG. 7b is an equivalent circuit diagram of FIG. 7a;

FIG. 7c is a graph showing a spectrum characteristic of the sensitivity of the device of FIG. 7a;

DETAILED DESCRIPTION OF PREFERRED EMBODIMENTS FIRST EMBODIMENT

Figure 1:
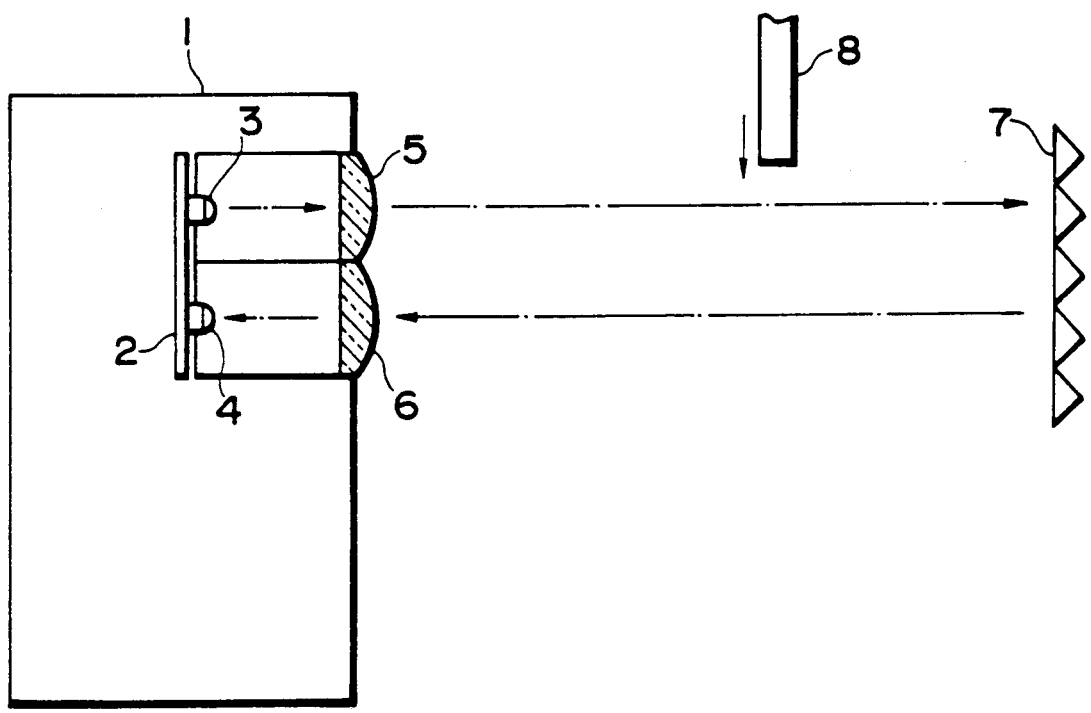
FIG. 1 is a diagram showing a construction of an optical system of a reflection type photoelectric switch according to an embodiment of the present invention.
Figure 2A:
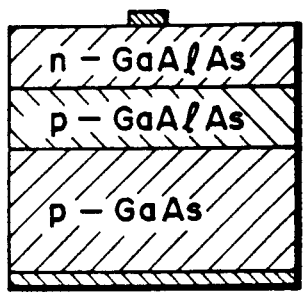
FIG. 2a shows a structure of a light emitting diode of a multi-color light emission type which is used as a light projecting device.

FIG. 1 is a diagram showing a structure of an optical system of a reflex reflection type photoelectric switching apparatus according to the first embodiment of the invention. In the diagram, a light projecting device 3, for instance, a light emitting diode and a photo sensitive device 4, for example, a photodiode are attached onto a printed circuit board 2 provided in a casing 1 of the photoelectric switch unit. For instance, the light projecting device 3 is a light emitting diode having a GaAiAs hetero junction structure as shown in FIG. 2a and uses the diode which can emit both of the red light and the infrared light as shown in a light emission spectrum characteristic graph of FIG. 2b. For instance, the light emitting diode used in the embodiment can simultaneously emit the strong red light having a center wavelength of 660 nm and the weak infrared light of 880 nm. The light projecting device 3 and photo sensitive device 4 are respectively provided with a collimating lens 5 and a condenser lens 6 at positions which respectively face the devices 3 and 4. The collimating lens 5 collimates the light emitted from the light projecting device 3 and projects onto a reflex reflector 7 in the direction perpendicular to the surface of the reflector 7. The reflex reflector 7 is arranged at a position away from the photoelectric switch unit by a predetermined distance. The condenser lens 6 focuses the reflected lights from the reflex reflector 7 or an object 8 to be detected onto the photo sensitive device 4.

Figure 3:
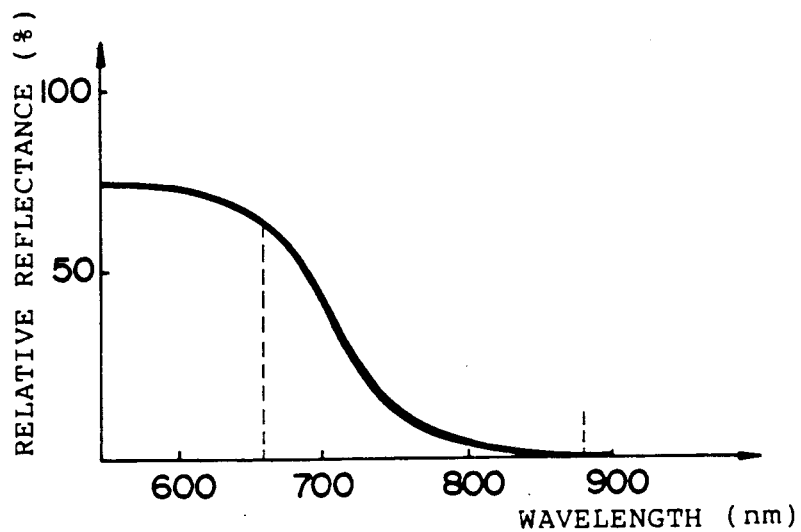
FIG. 3 is a graph showing a spectrum characteristic of a reflectance of a reflex reflector.

The reflex reflector 7 absorbs the infrared light and reflects only the red light and is constructed by integrally forming an assembly of corner cubes made of an acrylic resin in which a material such as to absorb the infrared light and to transmit the red light is mixed. As shown in FIG. 3, for instance, the reflex reflector 7 has a spectrum characteristic such that the infrared light of 880 nm is hardly reflected and 60% or more of the red light of 660 nm is reflected. The reflex reflector 7 can be also constructed by providing a infrared light absorbing (cutting) filter made of glass or plastics onto the surface of a reflex reflector having reflectances which are almost equal to the lights of all of the wavelengths.

Figure 4A:
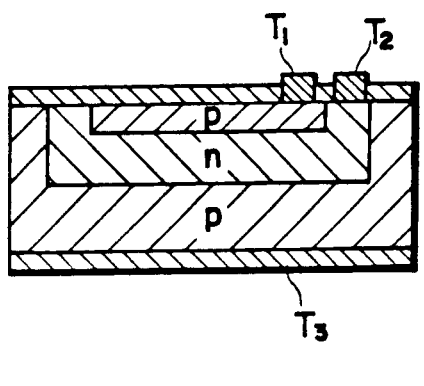
FIG. 4a shows a structure of a photo sensitive device.
Figure 4B:
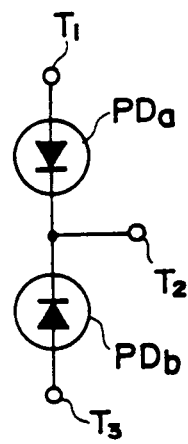

The photo sensitive device 4 is a color sensor for separating the lights of different wavelength bands and obtaining the light detection signals of the respective lights. For instance, as shown in a chip structure of FIG. 4a, the photo sensitive device 4 is constructed by providing two photodiodes having different junction depths into one chip. Since the wavelengths of the lights which are absorbed by the semiconductor substrate differ depending on the depths, different spectrum sensitivity characteristics can be applied to the two photodiodes. As shown in FIG. 4b, the photodiodes are equivalently expressed as two photodiodes $PD_a$ and $PD_b$. The photodiodes $PD_a$ and $PD_b$ have the sensitivity characteristics for the wavelengths as shown in, for instance, FIG. 4c, respectively. In FIGS. 4a and 4b, $T_1$, $T_2$, and $T_3$ denote terminals.

A construction of a detecting circuit of the embodiment will now be described with reference to FIG. 5. First, outputs of the two photodiodes $PD_a$ and $PD_b$ are supplied to amplifiers 10 and 11 having amplification factors of m and n, respectively. Outputs $V_a$ and $V_b$ of the amplifiers 10 and 11 are given to an adder 12 and a subtracter 13, respectively. The adder 12 adds the outputs of the two amplifiers 10 and 11 and its output $(V_a+V_b)$ is given to a first comparator 14. The subtracter 13 subtracts the output $V_b$ of the amplifier 11 from the output $V_a$ of the amplifier 10 and its output $(V_a-V_b)$ is given to a second comparator 15. Threshold values $V_{th1}$ and $V_{th2}$ are set to the comparators 14 and 15, respectively. When inputs which exceed the threshold values are given, the comparators 14 and 15 give outputs of the H level to an AND circuit 16 serving as AND means, respectively. The AND circuit 16 gives an AND signal to an output circuit 17. The output circuit 17 outputs a signal indicating whether an object has been detected or not to the outside on the basis of an output of the AND circuit 16.

Figure 2B:
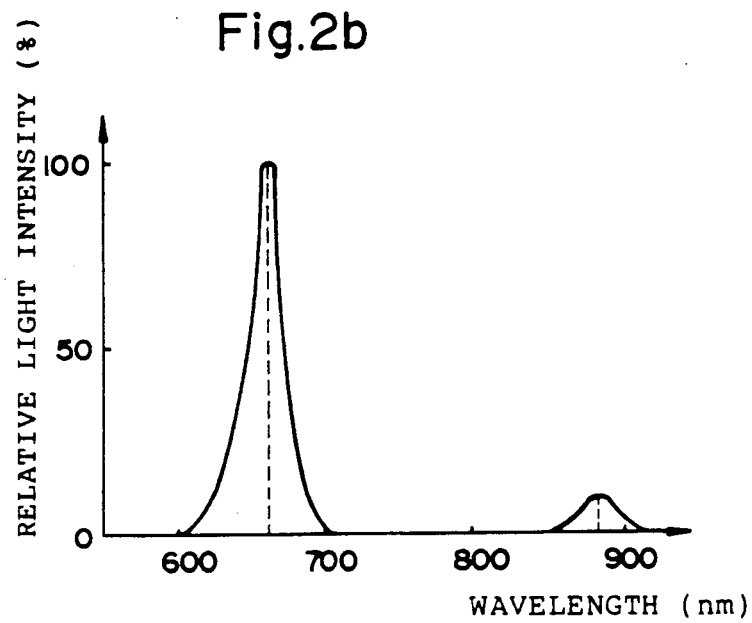

The light emitting diode as the light projecting device 3 emits the lights of a spectrum as shown in FIG. 2b, that is, the red light and infrared light. The red and infrared lights are projected to the reflex reflector 7 in the direction perpendicular to the surface of the reflector 7 through the collimating lens 5. The reflex reflector 7 is arranged at a position which is away from the reflection type photoelectric switch unit. The reflex reflector 7 absorbs the infrared light and reflects only the red light in the opposite direction. Therefore, only the red light is given to the photodiode as the photo sensitive device 4 through the condenser lens 6. An example of the operating state of each circuit in the photoelectric switch unit is shown in the following Table 1.

TABLE 1

| | CASES | | | | |
|---|---|---|---|---|---|
| | I | II | III | IV | V |
| Output of $PD_a$ | 5 | 0 | 60 | 6 | 1 |
| Output of $PD_b$ | 1 | 0 | 30 | 3 | 3 |
| Output of amplifier 10 (m = 10) | 50 | 0 | 600 | 60 | 10 |
| Output of amplifier 11 (n = 30) | 30 | 0 | 900 | 90 | 90 |
| Output of adder 12 | 80 | 0 | 1500 | 150 | 100 |
| Output of subtracter 13 | 20 | 0 | −300 | −30 | −80 |
| Output of comparator 14 $V_{th1} = 20$ | H | L | H | H | H |
| Output of comparator 15 $V_{th2} = 0$ | H | Unspecified | L | L | L |
| Output of AND circuit 16 | H | L | L | L | L |
| Output of output circuit 17 | Absence | Presence | Presence | Presence | Presence |

Figure 4C:
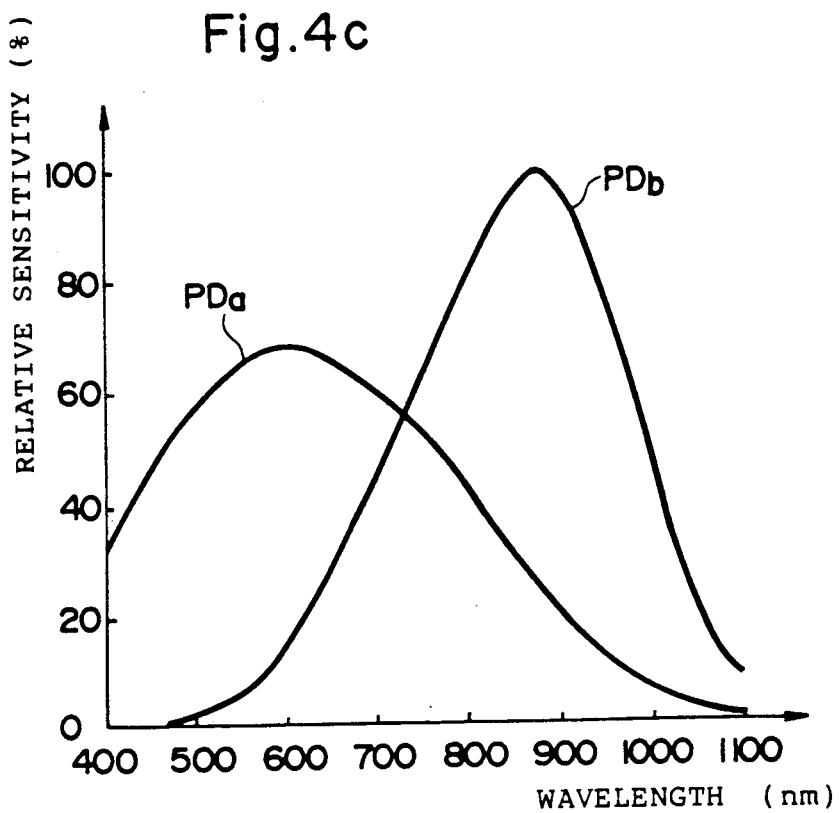

(I) In the case where no object exists:

Since the two photodiodes $PD_a$ and $PD_b$ of the photo sensitive device 4 have the spectrum sensitivity characteristic as shown in FIG. 4c, if an object to be detected does not exist, a photo current of a relatively high level is obtained from the photodiode $PD_a$ and a photo current of a low level is derived from the photodiode $PD_b$. In Table 1, the relative values of the photo currents of the photodiodes $PD_a$ and $PD_b$ which are obtained in the case (I) where an object to be detected does not exist are shown as 5 and 1. The amplification factors m and n of the amplifiers 10 and 11 are set so as to absorb variations in photodiodes $PD_a$ and $PD_b$ and variations in reflex reflector 7 and light projecting device 3 and are set to m = 10 and n = 30, respectively. On the other hand, the threshold voltage $V_{th1}$ of the comparator 14 is set to 20. The threshold voltage $V_{th2}$ of the comparator 15 is set to 0. The photo current outputs of the two photodiodes $PD_a$ and $PD_b$ are amplified by the amplifiers 10 and 11, respectively. Thus, the outputs (relative values 80 and 20 of the adder 12 and subtracter 13 as shown in Table 1 are obtained. By comparing the outputs of the adder 12 and subtracter 13 with the threshold values $V_{th1}$ and $V_{th2}$, the comparators 14 and 15 both output the high level signals. Thus, the AND condition is satisfied and an object detection output is not obtained.

(II) In the case of an ordinary shut-off object:

When the object 8 of a low reflectance completely shuts off the projection light, the output photo currents of the two photodiodes $PD_a$ and $PD_b$ substantially become zero. Therefore, as shown in Table 1, the output of the comparator 14 (case II) is set to the L level. Although the output level of the comparator 15 is unspecified (since the threshold level is 0, the output level changes between the H and L levels due to the noises), since the AND output of the AND circuit 16 is set to L, an object detection output is generated.

(III) In the case of an object having the mirror surface:

When an object having the mirror surface exists between the photoelectric switch unit and the reflex reflector 7, the strong reflected light enters the photo sensitive device. Since the reflectance of the mirror surface is constant independently of the wavelength, the infrared light also simultaneously enters the photo sensitive device 4. Therefore, for instance, as shown in Table 1, the photo currents corresponding to the relative values 60 and 30 are obtained from the photodiodes $PD_a$ and $PD_b$ (case III) by the optical system of the characteristics shown in FIGS. 2b, 3, and 4c. In this case, since the output of the comparator 14 is set to the H level and the output of the comparator 15 is set to the L level, the object detection output is derived.

(IV) In the case of an object of the white surface:

In this case as well, since the constant reflected light is obtained irrespective of the wavelength, its current level is small as shown in, for instance, Table 1 (case IV), so that an output of a tendency similar to that of the object having the mirror surface is obtained. Thus, the AND condition of the AND circuit 16 is not satisfied and the object detection output is also obtained in the same manner as in the case of the object of the mirror surface.

Figure 6:
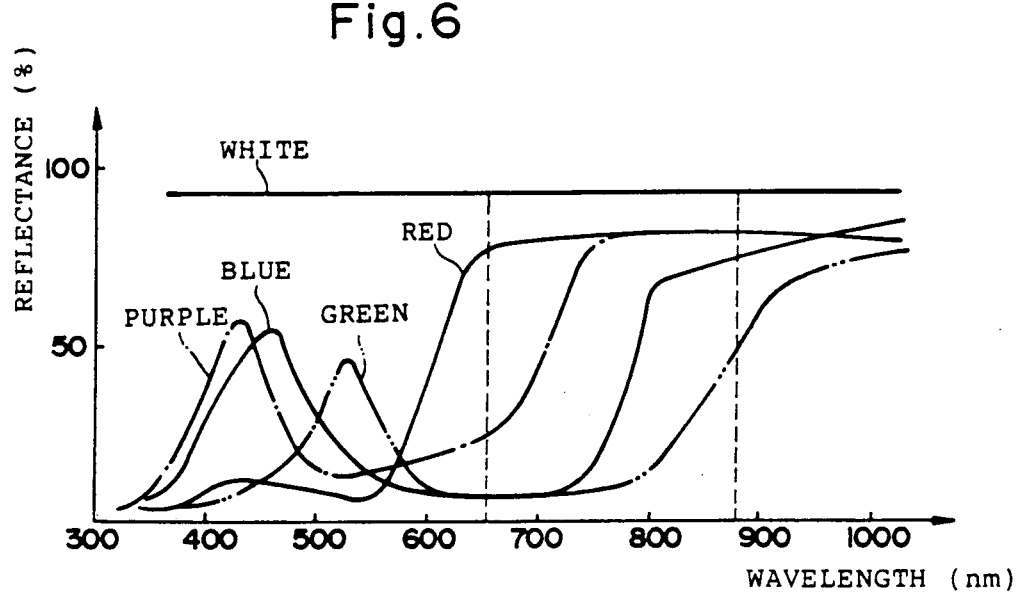
FIG. 6 is a graph showing a spectrum characteristic of a reflectance of an object having each color.

(V) In the case of an object of the blue surface:

As shown in FIG. 6, the reflectance of the blue object is low for the red light (660 nm in the embodiment) and is high for the infrared light (880 nm in the embodiment), so that the photo currents of the two photodiodes $PD_a$ and $PD_b$ are set to 1 and 3 (relative values) as shown in, for instance, Table 1 (case V), respectively. The comparators 14 and 15 output the H and L level signals in the same manner as in the case of the object of the mirror surface, respectively. Thus, the object detection signal can be obtained. As shown in FIG. 6, since all of the print colors can satisfy the relation of (the reflectance of the infrared light) ≧ (the reflectance of the red light), all of the objects to be detected can be certainly detected.

Figure 7A:
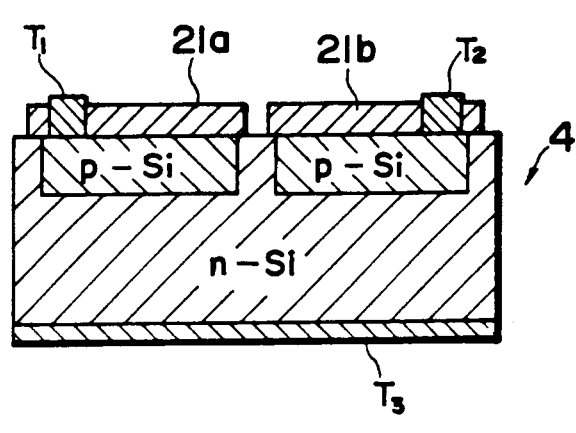
FIG. 7a shows another structure of a photo sensitive device.
Figure 7B:
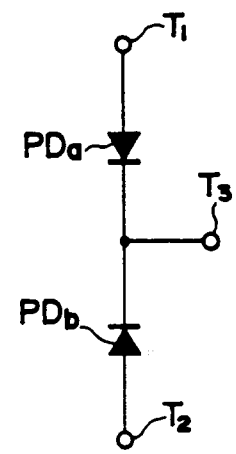
Figure 7C:
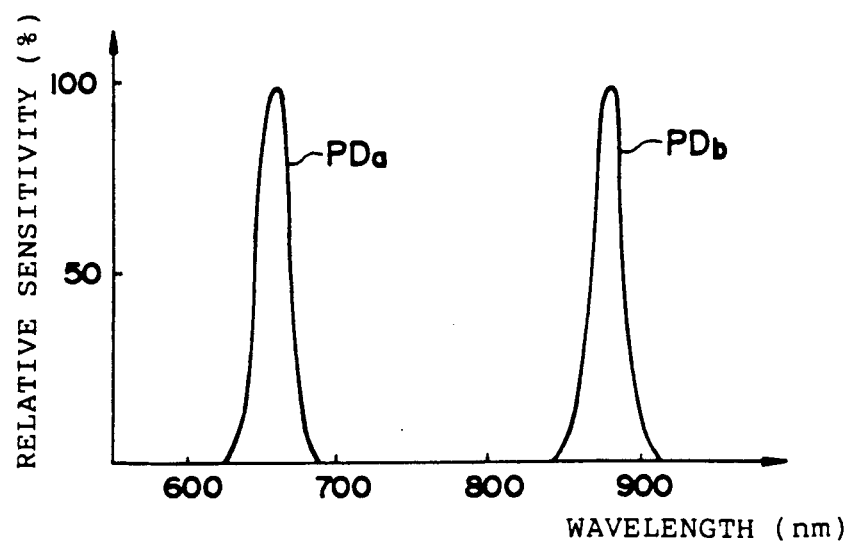

In the foregoing embodiment, by providing two photodiodes of different depths as the photo sensitive device 4 into one chip, the spectrum characteristics of the photodiodes are made different. However, as shown in FIG. 7a, it is also possible to construct in a manner such that two photodiodes $PD_a$ and $PD_b$ are separately formed at the positions of the same depth in the same chip, their photo sensitive regions are made different, thin film interference filters 21a and 21b having different pass wavelength bands are arranged in front of the photodiodes, and thereby making the spectrum characteristics of the photodiodes $PD_a$ and $PD_b$ different. In this case as well, an equivalent circuit of FIG. 7a can be expressed as shown in FIG. 7b in a manner similar to FIG. 4b. The spectrum characteristics correspond to the transmission characteristics of the thin film interference filters 21a and 21b as shown in FIG. 7c. In this case, every object can be also detected by the circuit construction similar to that of the foregoing photoelectric switch unit.

SECOND EMBODIMENT

Figure 8:
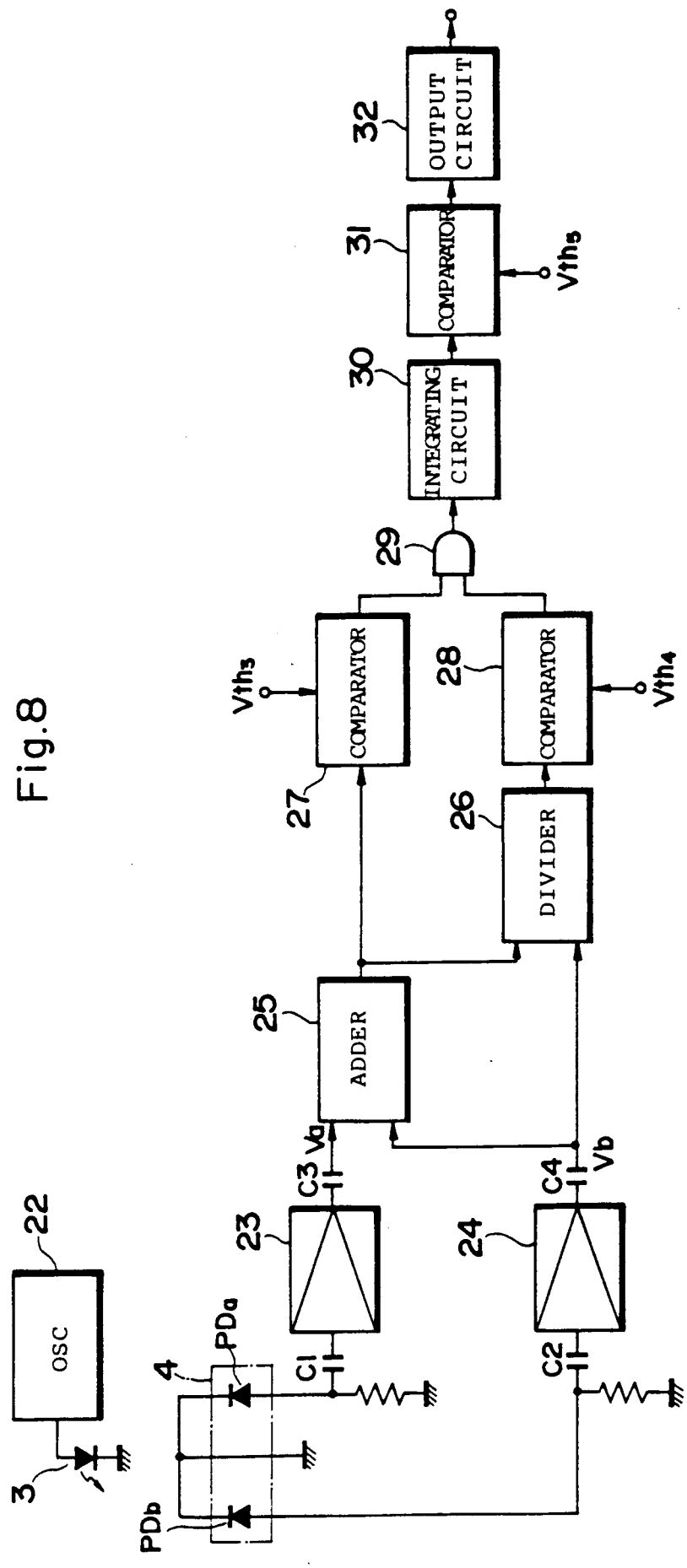
FIG. 8 is a block diagram showing an electrical arrangement of a reflection type photoelectric switch according to the second embodiment of the invention.

Although the first embodiment has been shown and described above with respect to the example in which the light emitting diode as the light projecting device 3 is continuously lit on, the light projecting device can be also lit on and off like pulses in order to improve the light emitting efficiency and to reduce the influence of the lights which enter from the outside. On the other hand, a ratio of the outputs of the two amplifiers can be also detected by a divider. FIG. 8 shows a block diagram of a detecting circuit section constructed as mentioned above. The light projecting device 3 is lit on and off like pulses by a clock signal of an oscillating circuit 22. Only the AC components of the outputs of the two photodiodes $PD_a$ and $PD_b$ are given through capacitors $C_1$ and $C_2$ to amplifiers 23 and 24 having the same amplification factor arranged at the next stage. The outputs $V_a$ and $V_b$ of the amplifiers 23 and 24 are given to an adder 25 through capacitors $C_3$ and $C_4$. The output $V_b$ of the amplifier 24 is also input to a divider 26. The adder 25 adds the inputs $V_a$ and $V_b$ and supplies its output to the divider 26 and a comparator 27. The divider 26 performs a division $(V_a+V_b)/V_b$ of the inputs and supplies its output to a comparator 28. Threshold values $V_{th3}$ and $V_{th4}$ are set to the comparators 27 and 28, respectively. When input signals which exceed the threshold values are given, the comparators 27 and 28 give H level outputs to an AND circuit 29. An output of the AND circuit 29 is averaged by being integrated by an integrating circuit 30. An output of the integrating circuit 30 is given to a comparator 31. A predetermined threshold level $V_{th5}$ is set to the comparator 31 and its output is supplied through an output circuit 32 to the outside as an object detection signal.

In the second embodiment shown in FIG. 8, it is assumed that the amplification factors of the amplifiers 23 and 24 are set to 10 and the threshold values $V_{th3}$ and $V_{th4}$ of the comparators 27 and 28 are set to, e.g., 20 and 4.5, respectively. Thus, as shown in the following Table 2, the object detection signals can be obtained for all of the cases II to V excluding the case I.

TABLE 2

|  | CASES | | | | |
| --- | --- | --- | --- | --- | --- |
|  | I | II | III | IV | V |
| Output of $PD_a$ | 5 | 0 | 60 | 6 | 1 |
| Output of $PD_b$ | 1 | 0 | 30 | 3 | 3 |
| Output of amplifier 23 | 50 | 0 | 600 | 60 | 10 |
| Output of amplifier 24 | 10 | 0 | 300 | 30 | 30 |
| Output of adder 25 | 60 | 0 | 900 | 90 | 40 |
| Output of divider 26 | 6 | Unspecified | 3 | 3 | 1.3 |
| Output of comparator 27 $V_{th3} = 20$ | H | L | H | H | H |
| Output of comparator 28 $V_{th4} = 4.5$ | H | Unspecified | L | L | L |
| Output of AND circuit 29 | H | L | L | L | L |
| Output of output circuit 32 | Absence | Presence | Presence | Presence | Presence |

In Table 2, the cases I to V are similar to those in the first embodiment. Even in any object, if it shuts off the projection light, either one of the comparators 27 and 28 outputs the L level signal, so that the object detection signal is output. The reason why the output level is unspecified in the case II is because the denominator (or divisor) in the division by the divider 26 becomes zero.

In each of the foregoing embodiments, the result of the addition or subtraction of the amplified outputs of the photodiodes is compared with the threshold value by the comparator. Or, the ratio of one of the outputs of the amplifiers and the result of the addition thereof is compared with the threshold value by the comparator. However, the presence or absence of the object can be also detected by other various kinds of signal processing systems.

THIRD EMBODIMENT

In the first and second embodiments, when an object having the mirror surface exists just near the light projecting device 3 and photo sensitive device 4 of the photoelectric switch unit, there occurs a problem such that the outputs of the amplifiers 10, 11, 23, 24, and the like are saturated. Thus, the outputs of the adders 12 and 25, subtracter 13, and the like do not have the correct values. The operations as shown in Tables 1 and 2 are not always assured. For instance, in the case III (the case of the object having the mirror surface) in Table 1, if the output of the subtracter 13 is set to a positive value and exceeds the threshold value $V_{th2}$ due to the saturation of the amplifiers 10 and 11, variations in component parts of the adder 12 and subtracter 13, or the like although it should be set to a negative value, the output of the comparator 15 is set to the H level. Thus, there is a fear such that in spite of the existence of an object, an output signal indicative of the absence of the object is obtained.

As the first construction to solve such a problem, there can be mentioned a construction such that the amplifiers 10, 11, 23, and 24 to amplify the outputs of the photodiodes $PD_a$ and $PD_b$ are constructed by logarithm amplifiers. Due to this, even in the case where the object having the mirror surface exists at a close position, the output voltages of the amplifiers 10, 11, 23, and 24 are not saturated and the occurrence of the erroneous operation is avoided.

The second construction is such that an automatic gain control (AGC) circuit to control the drive current of the light projecting device 3 is provided, the gain of the AGC circuit is controlled in accordance with the level of the output signal of the photo sensitive device 4, and thereby always keeping the drive current of the light projecting device 3 to a proper value. An example of such a construction is shown in FIG. 9.

Figure 5:
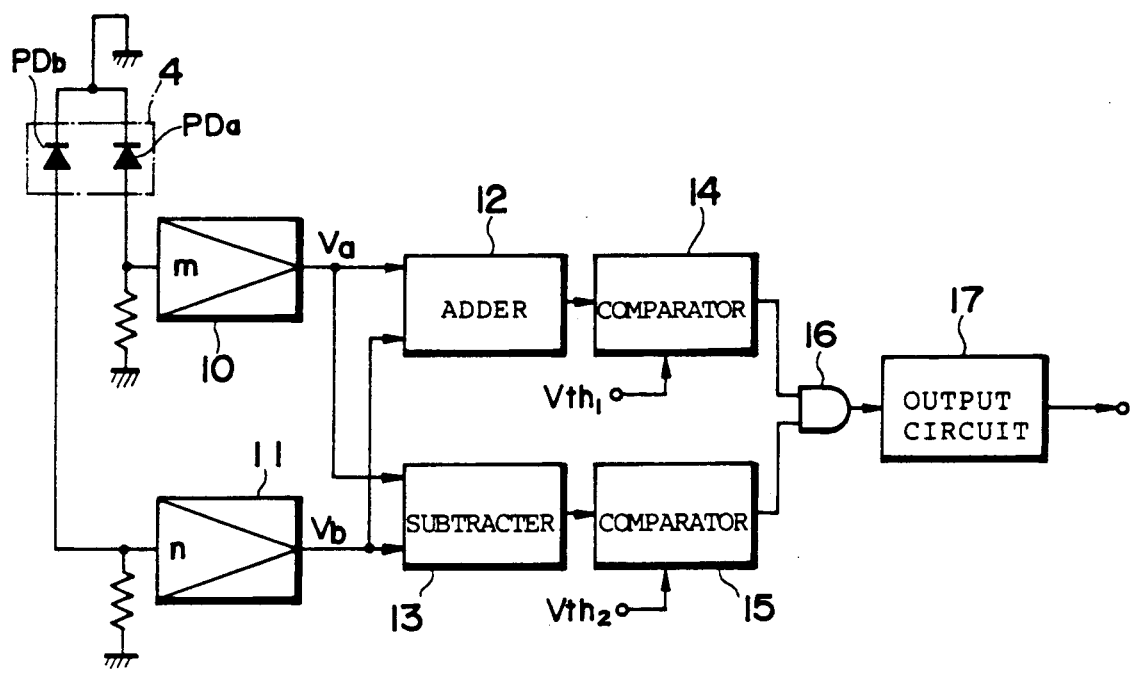
FIG. 5 is a block diagram showing an electrical arrangement of the photoelectric switch of the embodiment.
Figure 9:
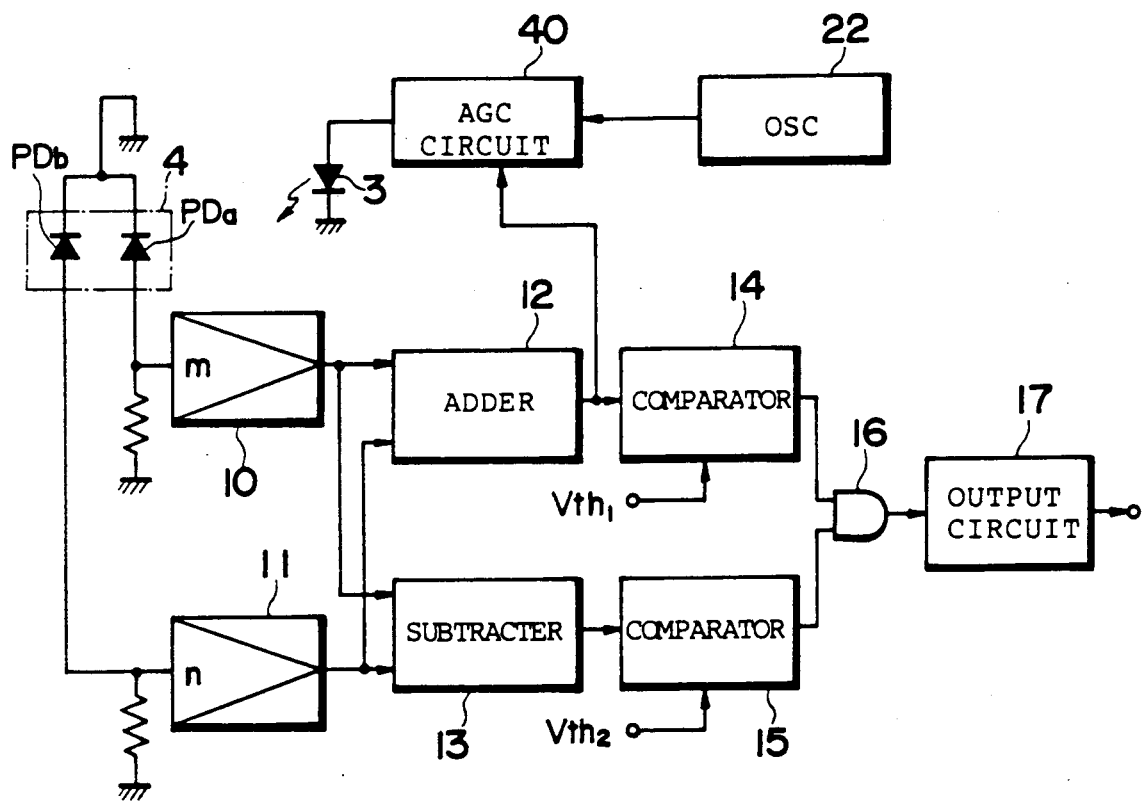
FIG. 9 is a block diagram showing the third embodiment.

The circuit of FIG. 9 has a circuit arrangement such that in the circuit shown in FIG. 5, the oscillating circuit 22 and an AGC circuit 40 for amplifying an oscillation pulse of the oscillator 22 and for driving the light projecting device 3 are provided to pulse drive the light projecting device 3. The gain of the AGC circuit 40 is controlled by the output of the adder 12. The gain of the AGC circuit 40 can be also controlled in accordance with the output current level of the photodiode $PD_a$ or $PD_b$. By controlling the AGC circuit 40 in accordance with the level of the light detection signal as mentioned above, a proper current (of a predetermined value) can be allowed to always flow through the light projecting device 3. Therefore, when the object 8 exists at a near position and the light detection signal level increases, the current flowing through the light projecting device 3 is reduced, thereby enabling the saturation of the outputs of the amplifiers 10 and 11 to be prevented. On the contrary, when the object 8 exists at a far distance position and the light detection signal level is low, by allowing a large current to flow through the light projecting device 3 and setting the light detection signal level to a proper large value, the object can be detected. Further, even when the light detection signal level decreases because the surfaces of the lenses 5 and 6 become dirty, by increasing the drive current of the light projecting device 3, a decrease in detectable range can be also prevented.

Further, in FIG. 9, by using the logarithm amplifiers as the amplifiers 10 and 11, the object can be detected in a wide range from the close distance to the far distance.

What is claimed is:

1. A reflection type photoelectric switching apparatus comprising:
    a single light projecting diode, said diode projecting a red light and an infrared light along the same optical axis;
    a reflex reflector located at a position distant to said light projecting diode, for reflecting the red light and for absorbing the infrared light;
    a photo sensitive means for individually detecting the red light reflected from said reflex reflector and red light and infrared light reflected from an object to be detected and for outputting a pair of light detection signals corresponding to the red light and infrared light;
    an adding means for adding said light detection signals;
    a first comparing means for comparing a level of a signal added by said adding means with a first threshold value;
    an arithmetic operating means for producing a signal relating to a difference between said light detection signals;
    a second comparing means for comparing a level of an output signal of said arithmetic operating means with a second threshold value; and
    a logic circuit for obtaining a predetermined logic of an output of said first comparing means and an output of said second comparing means and for outputting an object detection signal in accordance with the result of said logic.

2. An apparatus according to claim 1, wherein said arithmetic operating means is a subtracting means for calculating a difference between said two light detection signals.

3. An apparatus according to claim 1, wherein said arithmetic operating means is a dividing means for calculating a quotient of an output of said adding means and one of said light detection signals.

4. An apparatus according to claim 1, wherein said photo sensitive means includes a one-chip photo sensitive device, and said photo sensitive device has a portion to detect the red light and a portion to detect the infrared light.

5. An apparatus according to claim 1, further comprising a pair of logarithm amplifiers for amplifying said two light detection signals.

6. An apparatus according to claim 1, further comprising a means for controlling light emission outputs of said light projecting diode based on the light detection signals obtained from said photo sensitive means.

7. An apparatus according to claim 1, wherein optical axes of said light projecting diode and of the photo sensitive means substantially coincide, projection lights being projected in a direction which is almost perpendicular to said reflex reflector, and reflected lights being reflected almost perpendicularly from the reflex reflector.

8. The apparatus recited in claim 1 further comprising an oscillating means, said oscillating means triggering said single light projecting diode to project pulses of said red and infrared light along a same optical axis.

9. The apparatus recited in claim 8 wherein said light detection signals are found from AC components of signals output by said photosensitive means.

10. The apparatus recited in claim 9 comprising a capacitor for each light detection signal, one side of each said capacitor being connected to said output of said photosensitive means, said AC components being formed on the other side of said capacitors.

11. A method of detecting an object comprising the steps of:
    projecting from a single light projecting diode a red light and an infrared light along a same optical axis;
    reflecting the red light and absorbing the infrared light with a reflex reflector located at a position distant from the single light projecting means;
    in a photo sensitive means individually detecting the red light reflected from the reflex detector along with red light reflected from an object to be detected and infrared light reflected from the object to be detected and outputting a pair of light detection signals corresponding to the red light and the infrared light;
    adding the light detection signals in an adding means to produce an added output and comparing a level of the added output to a first threshold to produce a first comparison output;
    subtracting the light detection signals in a subtraction means to produce a difference output and comparing a level of the difference output to a second threshold to produce a second comparison output; and
    logically combining the first and second comparison outputs in a logic circuit having predetermined logic and outputting an object detection signal in accordance with the predetermined logic.

12. The method recited in claim 11 further comprising triggering the single light producing diode with an oscillating means to project pulses of the red and infrared light.

* * * * *